(12) United States Patent
Lessmann et al.

(10) Patent No.: US 12,025,462 B2
(45) Date of Patent: *Jul. 2, 2024

(54) METHOD FOR DETERMINING THE POSITION OF A VEHICLE

(71) Applicant: Aptiv Technologies AG, Schaffhausen (CH)

(72) Inventors: Stephanie Lessmann, Erkrath (DE); Ahmad Pishehvari, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 31 days.

This patent is subject to a terminal disclaimer.

(21) Appl. No.: 18/047,678

(22) Filed: Oct. 19, 2022

(65) Prior Publication Data

US 2023/0054783 A1 Feb. 23, 2023

Related U.S. Application Data (63) Continuation of application No. 17/093,357, filed on Nov. 9, 2020, now Pat. No. 11,506,511.

(30) Foreign Application Priority Data

Nov. 29, 2019 (EP) .................................... 19212492

(51) Int. Cl.
*G01C 21/00* (2006.01)
(52) U.S. Cl.
CPC ...... *G01C 21/3811* (2020.08); *G01C 21/3848* (2020.08); *G01C 21/387* (2020.08)
(58) Field of Classification Search
CPC ............ G01C 21/3811; G01C 21/3848; G01C 21/387; G01C 21/30; G01C 21/3602;
(Continued)

(56) References Cited

U.S. PATENT DOCUMENTS

| 4,948,258 A | 8/1990 | Caimi |
| 8,558,733 B2 | 10/2013 | Kamo et al. |

(Continued)

FOREIGN PATENT DOCUMENTS

| CN | 111366164 A | 7/2020 |
| DE | 10148062 A1 | 4/2003 |

(Continued)

OTHER PUBLICATIONS

"Extended European Search Report", EP Application No. 18153439.7, dated Sep. 12, 2018, 14 pages.

(Continued)

*Primary Examiner* — Thomas Ingram
(74) *Attorney, Agent, or Firm* — Harness, Dickey & Pierce, P.L.C.

(57) ABSTRACT

A computer implemented method for determining the position of a vehicle, wherein the method comprises: determining at least one scan comprising a plurality of detection points, wherein each detection point is evaluated from a signal received at the at least one sensor and representing a location in the vehicle environment; determining, from a database, a predefined map, wherein the map comprises a plurality of elements in a map environment, each of the elements representing a respective one of a plurality of static landmarks in the vehicle environment, and the map environment representing the vehicle environment; matching the plurality of detection points and the plurality of elements of the map; determining the position of the vehicle based on the matching; wherein the predefined map further comprises a spatial assignment of a plurality of parts of the map environment to the plurality of elements, and wherein the spatial assignment is used for the matching.

20 Claims, 7 Drawing Sheets

(58) Field of Classification Search
CPC ............. G01S 17/931; G01S 2013/932; G01S 2013/9323; G01S 2013/93271; G01S 2013/93274; G01S 7/539; G01S 13/723; G01S 13/876; G01S 13/89; G01S 17/66; G01S 17/86; G01S 17/89; G01S 7/417; G01S 13/589; G01S 13/865

See application file for complete search history.

(56) References Cited

U.S. PATENT DOCUMENTS

| | | | |
|---|---|---|---|
| 8,633,849 | B2 | 1/2014 | Shibata et al. |
| 9,041,588 | B2 | 5/2015 | Yasugi et al. |
| 9,199,643 | B1 | 12/2015 | Zeng |
| 9,618,608 | B2 | 4/2017 | Mizutani et al. |
| 2005/0259002 | A1 | 11/2005 | Erario et al. |
| 2006/0184488 | A1 | 8/2006 | Wentland |
| 2007/0028220 | A1 | 2/2007 | Miller et al. |
| 2010/0117889 | A1 | 5/2010 | Grube et al. |
| 2013/0009569 | A1 | 1/2013 | Knibbe et al. |
| 2014/0043185 | A1 | 2/2014 | Quellec et al. |
| 2015/0022392 | A1 | 1/2015 | Hegemann et al. |
| 2016/0139255 | A1 | 5/2016 | Bueschenfeld et al. |
| 2018/0067491 | A1 | 3/2018 | Oder et al. |
| 2019/0051153 | A1 | 2/2019 | Giurgiu et al. |
| 2019/0227145 | A1 | 7/2019 | Pishehvari et al. |
| 2020/0103236 | A1 | 4/2020 | Adams et al. |
| 2020/0175744 | A1 | 6/2020 | Rosenzweig |
| 2020/0217666 | A1 | 7/2020 | Zhang et al. |
| 2020/0217943 | A1 | 7/2020 | Pishehvari et al. |
| 2021/0101614 | A1 | 4/2021 | White et al. |
| 2021/0116925 | A1 | 4/2021 | Bellof et al. |
| 2021/0131823 | A1 | 5/2021 | Giorgio et al. |
| 2021/0141091 | A1 | 5/2021 | Pishehvari et al. |
| 2021/0213962 | A1 | 7/2021 | Pishehvari et al. |
| 2021/0348943 | A1 | 11/2021 | Hosoi et al. |
| 2021/0396862 | A9 | 12/2021 | Pishehvari et al. |
| 2022/0244351 | A1* | 8/2022 | Bybee ..................... G01S 13/00 |

FOREIGN PATENT DOCUMENTS

| | | | |
|---|---|---|---|
| DE | 102016205227 | A1 | 10/2017 |
| DE | 102016214030 | A1 | 2/2018 |
| EP | 1584520 | A2 | 10/2005 |
| EP | 3517996 | A1 | 7/2019 |
| WO | 2011023244 | A1 | 3/2011 |

OTHER PUBLICATIONS

"Extended European Search Report", EP Application No. 19207813.7, dated May 29, 2020, 15 pages.

"Extended European Search Report", EP Application No. 20151644.0, dated May 29, 2020, 15 pages.

"Extended European Search Report", European Application No. 19212492.3, dated Jun. 2, 2020, 14 pages.

"Foreign Office Action", EP Application No. 18153439.7, dated Dec. 4, 2020, 5 pages.

"Foreign Office Action", EP Application No. 1853439.7, dated Jul. 14, 2020, 5 pages.

"Non-Final Office Action", U.S. Appl. No. 16/241,404, dated Nov. 17, 2021, 23 pages.

Besl, et al., "A Method for Registration of 3-D Shapes", Feb. 1992, pp. 239-255.

Biber, "The Normal Distributions Transform: A New Approach to Laser Scan Matching", Nov. 2003, 6 pages.

Borenstein, et al., "Correction of Systematic Odometry Errors in Mobile Robots", Aug. 1995, pp. 569-574.

Bosse, et al., "Histogram Matching and Global Initialization for Laser-only SLAM in Large Unstructured Environments", Apr. 2007, pp. 4820-4826.

Burnikel, et al., "How to Compute the Voronoi Diagram of Line Segments: Theoretical and Experimental Results", Max Planck Institute for Informatics, DOI: 10.1007/BFb0049411, Apr. 2006, 14 pages.

Censi, "An ICP Variant Using a Point-to-line Metric", Jun. 2008, 7 pages.

Censi, et al., "Scan Matching in the Hough Domain", Jan. 2005, 6 pages.

Checchin, et al., "Radar Scan Matching SLAM using the Fourier-Mellin Transform", Jan. 2009, 10 pages.

Cole, et al., "Using Laser Range Data for 3D SLAM in Outdoor Environments", Jun. 2006, 9 pages.

Diosi, et al., "Laser Scan Matching in Polar Coordinates with Application to SLAM", Sep. 2005, 6 pages.

Haklay, et al., "OpenStreetMap: User-Generated Street Maps", Oct. 2008, pp. 12-18.

Kirchner, et al., "Der Laserscanner ALS Intelligenter KZF-Sensor", Jan. 1, 1998, pp. 26-32, 34.

Levinson, et al., "Robust Vehicle Localization in Urban Environments Using Probabilistic Maps", Jun. 2010, 7 pages.

Lingermann, et al., "Indoor and Outdoor Localization for Fast Mobile Robots", Jan. 2004, 6 pages.

Lu, "Robot Pose Estimation in Unknown Environments by Matching 2D Range Scans", Nov. 1997, pp. 249-275.

Minguez, et al., "Metric-Based Iterative Closest Point Scan Matching for Sensor Displacement Estimation", Nov. 2006, 7 pages.

Nister, et al., "Visual Odometry", Jul. 2004, 8 pages.

Pishehvari, et al., "Ego-pose estimation via Radar and Openstreetmap-based Scan matching", May 2018, 8 pages.

Pishehvari, et al., "Robust Range-Doppler Registration with HD Maps", Apr. 2020, 9 pages.

Schwertfeger, et al., "Map Evaluation Using Matched Topology Graphs", Auton Robot (2016) 40:761-787, DOI 10.1007/s10514-015-9493-5, 27 pages.

Streller, et al., "Object Tracking in Traffic Scenes with Multi-Hypothesis Approach Using Laser Range Images", Sep. 30, 2001, 8 pages.

* cited by examiner

$$d(P) = \begin{cases} |\vec{P} \times \vec{S} - \vec{L}_{min} \times \vec{L}_{max}|/\|\vec{S}\| & \text{if } 0 < (L^{max}P)^T \cdot \vec{S} < \|\vec{S}\|^2 \\ \min\left((L^{max}P)^T \cdot \vec{S},\, (L^{min}P)^T \cdot \vec{S}\right) & \text{otherwise} \end{cases}$$

20

$$\sum_{i=1}^{M} \sum_{j=1}^{N} \left[ f(p_{ij}) \cdot (\vec{n_j}^T (R \cdot d_i + \vec{t}) - b_j) \right]^2$$

METHOD FOR DETERMINING THE POSITION OF A VEHICLE

CROSS-REFERENCE TO RELATED APPLICATIONS

This application is a continuation of U.S. patent application Ser. No. 17/093,357, filed Nov. 9, 2020, which claims priority to European Patent Application Number 19212492.3, filed Nov. 29, 2019, the disclosures of which are incorporated by reference in their entireties herein.

TECHNICAL FIELD

The present disclosure relates to a computer implemented method for determining the position of a vehicle.

BACKGROUND

A method for determining the position of a vehicle can be provided for a vehicle which is equipped with a sensor system, wherein the sensor system includes at least one sensor for receiving electromagnetic radiation emitted from at least one emitter of the sensor system and reflected in a vehicle environment towards the at least one sensor. The method comprises: determining at least one scan comprising a plurality of detection points, wherein each detection point is evaluated from electromagnetic radiation received by the at least one sensor and representing a location in the vehicle environment; determining, from a database, a predefined map, wherein the map comprises a plurality of elements in a map environment, each of the elements representing a respective one of a plurality of static landmarks in the vehicle environment, and the map environment representing the vehicle environment; matching the plurality of detection points and the plurality of elements of the predefined map; determining the position of the vehicle based on the matching.

Self-localization or ego-localization of a vehicle with respect to a predefined map such as a navigation map is an important task in the field of autonomous driving and similar applications. On-board radar systems are able to detect objects like buildings, trees, poles and other vehicles—even under bad weather conditions.

The radar detections acquired by a radar system (or other detection points) can be used to localize the vehicle within the navigation map. The navigation map can be gathered from a publicly available database. For example, it can be a so called "OpenStreetMap". Alternatively, the navigation map can be provided by a commercial map provider. Such maps usually are particularly accurate. Generally, the navigation map can be derived from a global database on the basis of a given position of the vehicle, e.g. from a global position system of the vehicle. Alternatively, a preliminary position estimate can be determined using odometry.

The static landmarks can be known static objects, i.e. infrastructural objects or persistent objects, like walls of buildings, barriers, fences, pavement edges, poles, bigger plants, trees and the like. The map data stored in the database comprise simplified mathematical representations of the landmarks, for example in the form of extended geometrical objects like lines. Each of the elements comprises information about its position in a world coordinate system.

The term "matching" can be understood in the sense of evaluating a correspondence between the radar detection points and the elements of the map. To carry out the matching, a so called Scan Matching algorithm can be applied. An example of a Scan Matching algorithm is disclosed in EP 3 517 996 A1. In the context of Scan Matching, the correspondence between the detection points and the elements of the map is exploited for the determination of the position of the vehicle.

Although the methods can use a radar system of a vehicle, it is understood that the methods may also be adopted using detection points of a LiDAR system instead of a radar system. Combinations of radar and LiDAR detection points may also be possible.

For the matching, every scan of a current set of (e.g. radar) scans can be projected into the closest map element (Building/wall). The closest map element has to be identified before the projection. If the scan matching algorithm is executed in a more complex environment within a large area, e.g. a whole city, consisting of more buildings/walls or applied for every radar scan recursively/circularly the computational effort increases and a more sophisticated approach for calculating the map projection is needed.

Therefore, a problem associated with the matching is the high computational load. Accordingly, there is a need to provide a more efficient method for determining the position of a vehicle.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for determining the position of a vehicle equipped with a sensor system, wherein the sensor system includes at least one sensor for receiving electromagnetic radiation emitted from at least one emitter of the sensor system and reflected in a vehicle environment towards the at least one sensor, wherein the method comprises: capturing at least one scan comprising a plurality of detection points, wherein each detection point is evaluated from electromagnetic radiation received by the at least one sensor and representing a location in the vehicle environment; determining, from a database, a predefined map, wherein the map comprises a plurality of elements in a map environment, each of the elements representing a respective one of a plurality of static landmarks in the vehicle environment, and the map environment representing the vehicle environment; matching the plurality of detection points and the plurality of elements of the map; determining the position of the vehicle based on the matching; wherein the predefined map further comprises a spatial assignment of a plurality of parts of the map environment to the plurality of elements, and wherein the spatial assignment is used for the matching.

The parts are defined by spatial positions arranged as a mesh grid which comprise the positions for any potential detection point.

The spatial assignment allows for a more efficient assignment between the detection points and the elements. This means that for assigning a given detection point to one or more of the elements it is not necessary to carry out an exhaustive search through the elements, for example in order to find the nearest element for the given detection point. Instead, the spatial assignment readily gives the information to which element a given detection point is assigned. In this regard, the spatial assignment can be regarded as an additional layer of the map, which is pre-computed, i.e. predetermined so that complex assignment steps can be avoided during runtime of the method. The method therefore enables a particularly efficient self-localization of vehicles within any kind of environment and in particular in urban environments. In experiments, it has been found that the proposed method outperforms conventional scan matching algorithms by 35 percent in time.

It is understood that the emitter of the sensor system can emit electromagnetic radiation during determining the one or more scans. In one example, the sensor system can be a radar sensor system and the detection points can be radar detection points.

The matching comprises: identifying, for a respective one of the plurality of detection points, a respective one of the plurality of parts of the map environment, the respective one of the plurality of parts of the map environment representing a part of the vehicle environment including the location represented by the respective one of the plurality of detection points; identifying a respective one of the plurality of elements being assigned to the identified respective one of the plurality of parts of the map environment; assigning the identified respective one of the plurality of elements to the respective one of the plurality of detection points. These steps can be carried out for all or some of the plurality of detection points. It is understood that these steps can be carried out with low computational load because the predefined map already comprises the spatial assignment. Particularly, the assignment of the element to the detection point is carried out on the basis of the spatial assignment. This assignment can be fully predetermined by the spatial assignment of the map.

A mixed mode of predetermining the spatial segments with more than one of said methods can be used to avoid the calculation of the distance during algorithm execution time.

It is generally understood that a part of the map environment is preferably assigned to only one single element of the map. However, it is possible that a part of the map environment is assigned to more than one element. This may be useful for partially overlapping elements. For example, a corner point can be the end point of two connected lines, wherein the lines form elements of the map.

Advantageous embodiments of the invention are specified in the dependent claims, in the description and in the appended drawings.

According to an embodiment, the predefined map comprises a definition of a plurality of spatial segments, each of the spatial segments representing a part of the map environment and being assigned to a respective one of the plurality of elements. The spatial segments can be configured as so-called Voronoi segments or cells. The Voronoi segments form a Voronoi diagram, which can be used as an additional layer of the map. In general, a Voronoi diagram is a partition into regions of detection points, which have the closest distance to a respective element from all elements of the map (e.g., points or lines). It can give a probability for assignment of a detection point to its nearest map element. The distance between the detection point and its corresponding map element can be given by a distance metric, e.g. Euclidian distance.

The spatial segments can be defined in different ways, for example by a number of (discrete) positions forming a grid, for example like pixels of an image. The positions are structured in groups, wherein each position of a respective group has the same assignment to one or more elements of the map. Hence, a spatial segment is formed. Alternatively or additionally, the spatial segments can be defined by corner points of the spatial segments, wherein the corner points are connected by boundary lines of the segments. Further and similar approaches for defining and determining the spatial segments can be found in the following publication: Burnikel, Christoph, Kurt Mehlhorn, and Stefan Schirra: "How to compute the Voronoi diagram of line segments: Theoretical and experimental results." *European Symposium on Algorithms*. Springer, Berlin, Heidelberg, 1994.

One way to determine the spatial segments is to discretize the map elements (e.g., lines). Fortune's algorithm can then be used to calculate the Voronoi cells on points created on the elements (e.g., line segments) to calculate the line assignment beforehand. For this aim, the Voronoi cells intersected by the same line are joined. Finally, all boundary indices of the line segment Voronoi cells are stored and can be evaluated during the scan matching algorithm by checking which polygon (i.e. spatial segment) a detection point is assigned to. This method has the advantage to provide very accurate spatial segment boundaries (i.e. Voronoi cell boundaries).

According to an embodiment, the matching is carried out on the basis of identified respective ones of the plurality of elements and respective ones of the plurality of detection points to which the identified respective ones of the plurality of elements have been assigned. The assignment can be solely based on the spatial assignment, i.e. the element being assigned to the part of the map, which comprises a given detection, is also assigned to the given detection point. However, it is possible to incorporate further rules, for example that an assignment of an element to a given detection point requires that the distance between the element and the given detection point is below a predefined threshold. In this way, noisy detection points can be filtered so that they do not influence the matching.

According to an embodiment, the method comprises determining at least one confidence value for a respective one of the plurality of detection points on the basis of the spatial assignment, wherein the at least one confidence value represents a probability that the respective one of the plurality of detection points is assigned to a respective one of the plurality of elements, and wherein the matching is carried out on the basis of the at least one confidence value. In other words, detection points can be matched to one or more elements in dependence of a confidence value. In one example, a plurality of confidence values can be determined for a respective detection point, each of the confidence values representing the probability that the respective detection point is assigned to a respective one of the plurality of elements.

According to an embodiment, the at least one confidence value is determined on the basis of a Monte-Carlo simulation for the respective one of the plurality of detection points. This can be done one the basis of pose uncertainties (e.g., standard deviation of position and heading of the preliminary position of the vehicle) and/or detection point uncertainties (e.g., standard deviation in angle and range for a radar detection point).

According to an embodiment, the at least one confidence value is transformed to an exponential weighting factor and wherein the matching comprises weighting by the exponential weighting factor. The exponential weighting is effective to focus on major influences and to alleviate effects of outliers. However, other weighting schemes are also possible.

According to an embodiment, the predefined map further comprises a plurality of distance values representing distances between the plurality of parts of the map environment being assigned to the plurality of elements and the elements, respectively. The distance values can be used for the matching in order to further increase the efficiency of the method. The distances can be defined as Euclidian distances. The parts can be defined by spatial segments, as indicated further above.

According to an embodiment, the spatial assignment identifies, for a respective one of the plurality of parts of the map environment, a respective one of the plurality of elements having a minimum distance to the respective one of the plurality of parts of the map environment. Accordingly, each of the distances of the map can be a minimum distance, for example defined by the orthogonal projection of the detection point onto the element. In one example, the element can be a line, so the detection point is projected onto the line.

According to an embodiment, the matching comprises determining a rigid transformation function by minimizing distances between transformed detection points and elements being assigned to the plurality of transformed detection points by means of the spatial assignment, wherein the transformed detection points are respective ones of the plurality of detections points transformed by means of the rigid transformation function.

According to an embodiment, the at least one element of the map comprises an extended geometrical object, in particular a line or a surface, preferably a straight line or a plane. In one example, the elements are formed by lines, wherein each of the lines is defined to extent between two spatially defined end points of the lines. The line can be a vector between two end points.

According to an embodiment, the matching comprises particle filtering. A particle filter is powerful for global self-localization of the vehicle. Because of the high computational burden for particle filtering using the proposed spatial assignment of the map significantly reduces the computational load. For global self-localization using particle filtering the weighting process can be computationally intensive. For weight calculation, the particle is projected into the map based on the angle of every detection point. The distance between the particle and its projection is compared to the detection range. In one example, the map can be a parking lot map, wherein the initialization (finding the initial pose of the vehicle) requires a distribution of ≈30000 particles. Considering this number of particles and the number of detection points up to 128 detection points for each radar scan, the weighting process can hardly be performed in an acceptable time for real time applications. Applying the spatial assignment for the assignments and distance calculation reduces the computational time considerably (tests have shown a reduction in time by 99 percent). This considerable computation time reduction allows further real-time capable developments of global self-localization based on particle filtering, particularly when the area of the unknown initial pose becomes smaller (not as large as the whole parking lot).

According to an embodiment, the method further comprises determining a preliminary position of the vehicle, and wherein determining the position of the vehicle comprises transforming the preliminary position by means of the rigid transformation function.

According to an embodiment, the method further comprises determining the position, in particular the preliminary position, on the basis of a motion model of the vehicle, wherein the motion model is determined on the basis of at least one measurement from at least one motion sensor of the vehicle and/or on the basis of at least some of the plurality of detection points of the at least one scan. The motion model can be a model which describes the trajectory of the vehicle over time. The model can be initialized with some value and is then periodically updated based on motion measurements of the vehicle. In this regard, the motion model is preferably determined on the basis of at least one measurement from at least one motion sensor of the vehicle and/or on the basis of at least some of the detection points. The combination of measurements from a motion sensor and a radar system can further enhance the accuracy of the method. As an alternative to using a motion model a suitable localization system can be used, for example on the basis of a DGPS (Differential Global Positioning System).

The measurement from the at least one motion sensor can comprise a velocity and/or a yaw rate of the vehicle, wherein the vehicle preferably comprises corresponding sensor facilities. This is also known as "dead-reckoning" measurements. Preferably, the velocity and/or the yaw rate of the vehicle is determined on the basis of wheel-speed-sensor (wheel rotation per time span) measurements and/or yaw-rate-sensor measurements. Dead-reckoning measurements taken alone have been found to provide inaccurate estimations of the vehicle position under certain conditions, e.g., during strong steering maneuvers. For this reason, the estimation based on dead-reckoning can represent a preliminary estimation of the vehicle's position.

The position of the vehicle can comprise coordinates representing a location and an orientation of the vehicle.

In another aspect, the present disclosure is directed at a computer system, said computer system being configured to carry out several or all steps of the computer implemented method described herein. The computer system can be connected or connectable to a sensor or sensor system of a vehicle, wherein the sensor or sensor system can be configured to perform at least the method step of determining the at least one scan. The sensor can be part of a sensor unit, which can be a radar sensor unit or a LiDAR sensor unit.

The computer system can be configured to perform other method steps disclosed herein, in particular determining the predefined map, transforming the map, matching and/or determining the position. Related method steps can also be performed by the computer system. The computer system can also be connected or connectable to motion sensors of the vehicle or to a localization system in order to determine a preliminary position of the vehicle, for example by using a motion model of the vehicle. The computer system can be formed or can be part of a computing unit or system of the vehicle, for example an electronic control unit (ECU) of the vehicle.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein. The non-transitory data storage and/or the memory unit may comprise a data base in which map data for determining the predefined map is stored.

In another aspect, the present disclosure is directed at a vehicle equipped with a sensor system adapted to receive electromagnetic radiation emitted from at least one emitter of the sensor system and reflected in a vehicle environment towards the sensor system, and a computer system for determining a position of the vehicle on the basis of the emitted and the reflected radiation.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
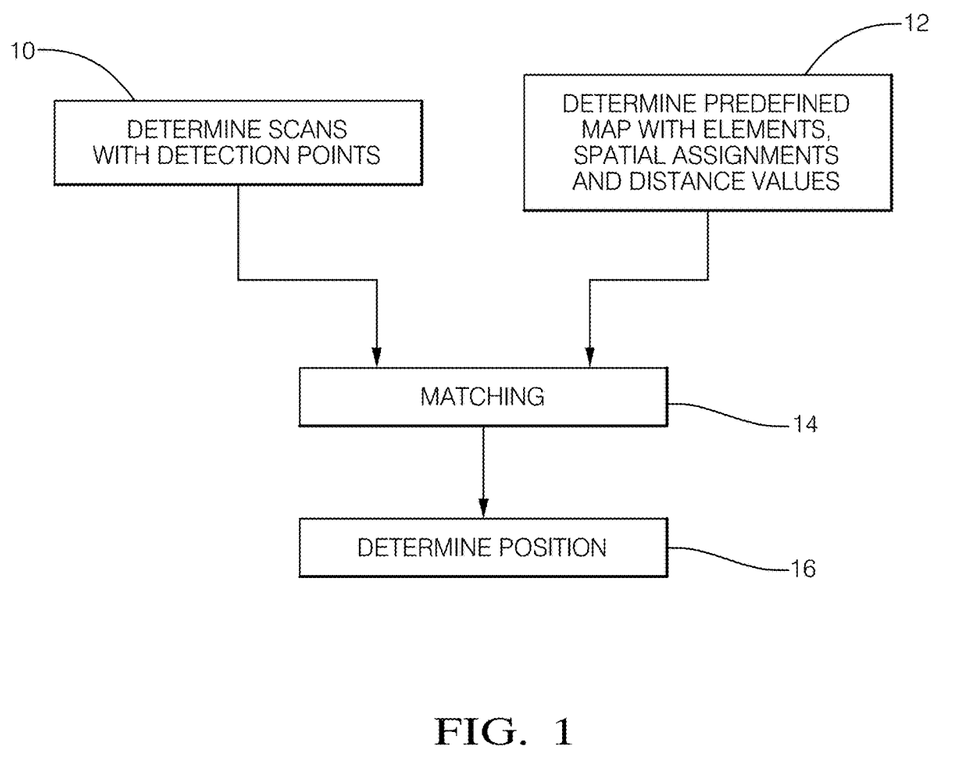
FIG. 1 a block diagram of method for determining the position of a vehicle.

FIG. 1 depicts a block diagram of a method for determining the position of a vehicle. The method can be carried out by a computer system of the vehicle (not shown). In block 10, a plurality of scans are determined, each of the scans comprising a plurality of detection points. In block 12, a predefined map is determined from a database, wherein the map comprises a plurality of elements, each of the elements representing a static landmark. The database is stored in a non-transitory storage medium of the computer system. In the following, the elements of the map are assumed to be formed by lines. However, other types of elements are also possible.

The database comprises map data for a large area, wherein the map is determined by taking a portion of the map data, which corresponds to a preliminary position of the vehicle. In other words, the map comprises lines in a map environment, which corresponds to a current vehicle environment. The map also comprises a spatial assignment of parts of the map environment to the elements of the map. Particularly, the map environment is represented by a plurality of positions (e.g. a grid), wherein each of the positions is assigned a line of the map. The positions are potential positions of detection points of the scans. The map further comprises a distance value for each of the positions. The distance values give the minimum distance between the positions and the assigned lines, respectively. This will be described further with respect to FIG. 2 and FIG. 3.

In block 14, matching is carried out between the detection points and the elements of the map. The spatial assignment of the predefined map is used for the matching and allows for carrying out the matching with high efficiency. For a given detection point the corresponding position in the map environment is identified, which can comprise one or more rounding operations of one or more coordinates of the detection point to coordinates of the nearest position in the map environment. Other ways of identifying the position are also possible. On the basis of the spatial assignment the element being assigned to the position is also assigned to the detection point. No exhaustive search through all elements of the map is necessary. Instead, the nearest element for a given detection point can readily be identified using the spatial assignment, which is part of the predetermined map.

In block 16, the current position of vehicle is determined on the basis of the matching. This can comprise updating the preliminary position with information from the matching, in particular a rigid transformation function.

Figure 2:
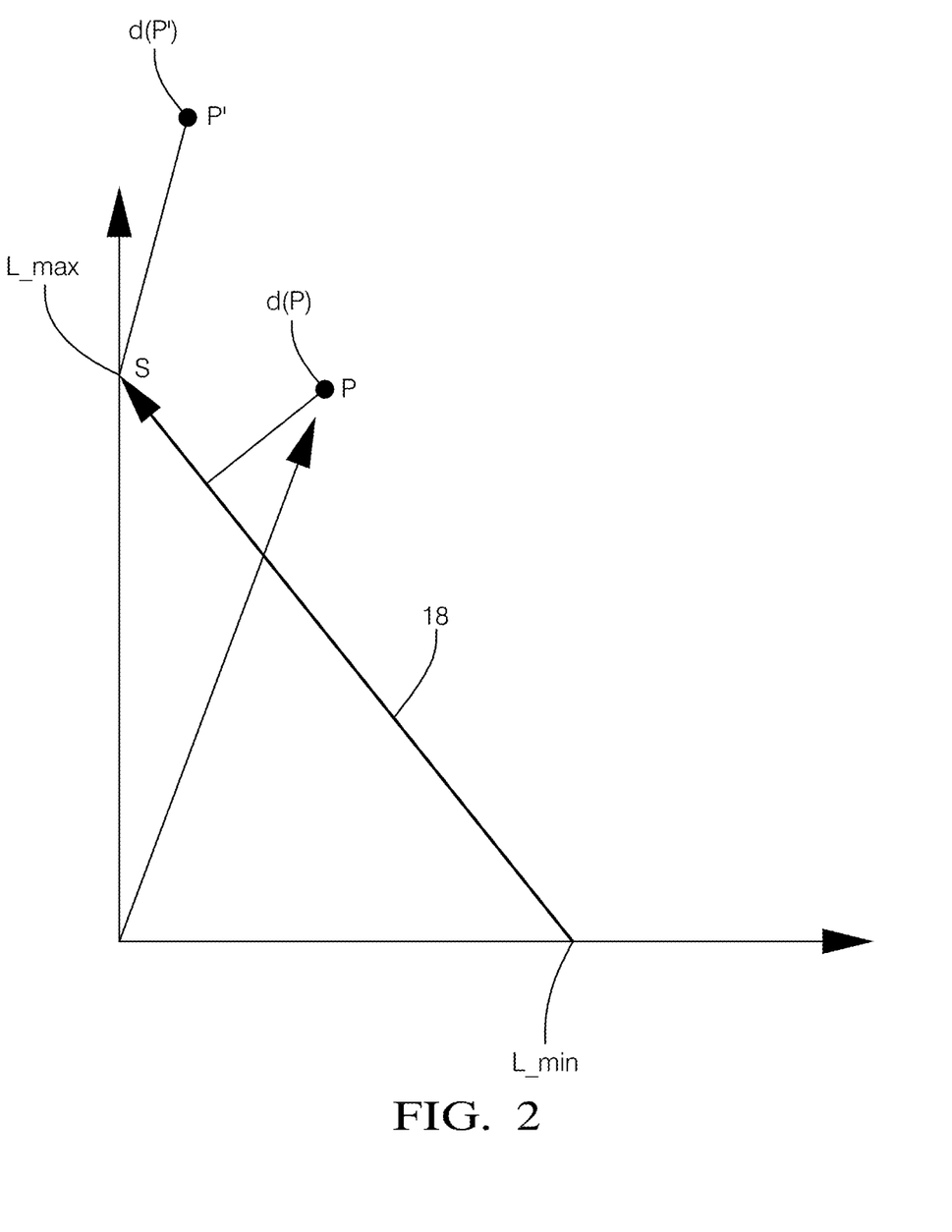
FIG. 2 distances between exemplary detection points and a line being assigned to the detection points.

FIG. 2 shows two exemplary detection points P and P', which are assigned to an element 18 of the map. The element 18 is considered to be the nearest element for both detection points P and P'. The element 18 is a line segment S, which extends between a first endpoint $L_{min}$ (i.e. startpoint) and a second endpoint $L_{max}$. The distance between the detection point P and the line S is the Euclidean distance d(P), which is the minimum distance between P and S (orthogonal projection). For the detection point P', the minimum distance is d(P'), as shown in FIG. 2, which is the distance between P' and the end or corner point $L_{max}$. In general, the minimum distance calculation can be expressed by formula 20 shown in FIG. 3. The first case of formula 20 describes the orthogonal projection, as for detection point P in FIG. 2. The second case of formula 20 describes the minimum distance to one of the endpoints, as for the detection point P' in FIG. 2.

Figure 4:
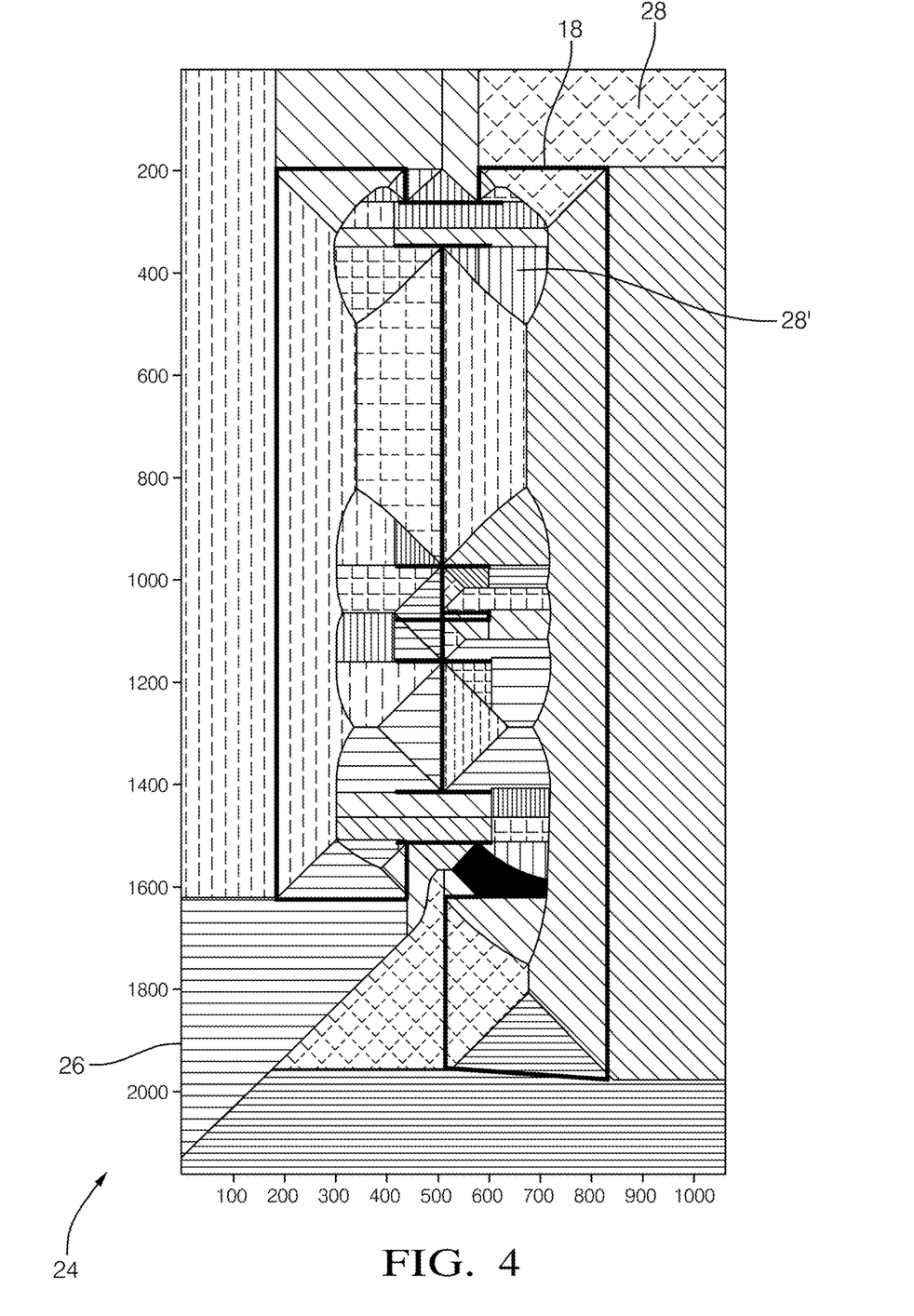
FIG. 4 exemplary spatial segments assigned to lines of a map.
Figure 5:
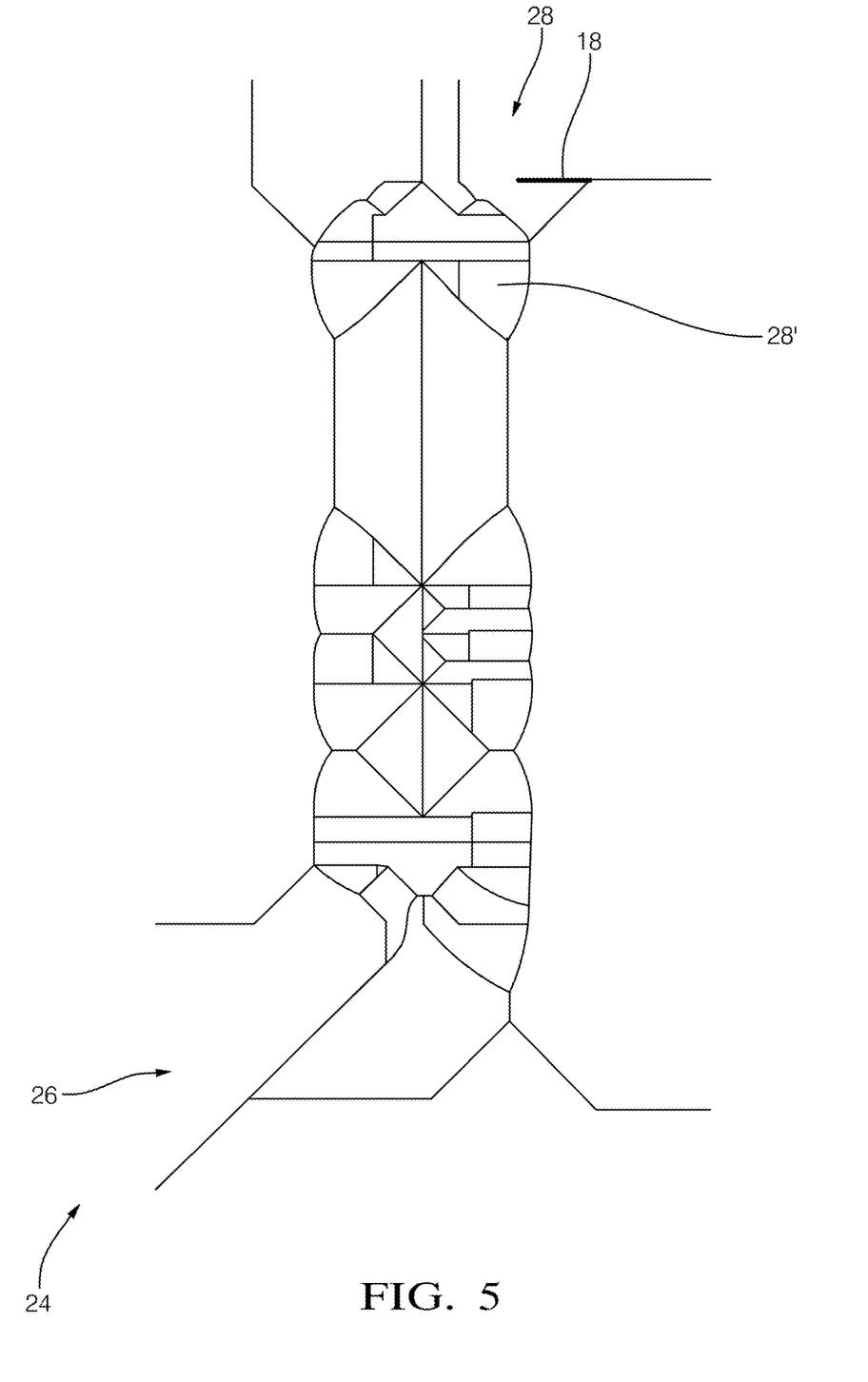
FIG. 5 the spatial segments from FIG. 2 as a line drawing.

Formula 20 is used to compute a spatial assignment between parts of the map and the elements of the map, for example the element 18. The result is shown in FIG. 4, which shows an exemplary map 24 comprising a plurality of elements, for example element 18, in a map environment 26. The map environment 26 is divided into spatial segments 28, which are shown in different grey scales in FIG. 4 and which form parts of the map environment 26. The spatial segments are shown without grey scales in FIG. 5, see segments 28 and 28' for example. The spatial segments are assigned to the lines in the map environment 26, respectively. For example, the spatial segment 28 is assigned to line 18, which is the line with the minimum distance to all points within the spatial segment 28. The spatial segments 28 can be determined offline (e.g. before carrying out the method described in FIG. 1) on the basis of a regular grid of positions covering the map environment 26. For each position formula 20 is used to determine the minimum distance to all of the lines (i.e. elements) in the map environment 26. The minimum from all distance values for all of the lines is than selected and the respective line is assigned to the respective position. In this way, a spatial assignment is computed for each point of the grid, i.e. each position is assigned to the nearest line. The spatial assignment is stored as a look-up table as an additional layer of the map 24. Additionally, the corresponding distance value is stored for each of the positions as another additional layer of the map. During run time, see blocks 10, 12, and 14 in FIG. 1, the map is evaluated for each of the detection points. For example, if a given detection point P is located inside the spatial segment 28, the line 18 is readily determined as the nearest line from all lines of the map by using the spatial assignment of the map. Additionally, the distance value d is known from the map. Matching can then be carried out between detection points and the assigned lines, wherein the overall matching process is very efficient due to the spatial assignment and the distance values, which forms precomputed data.

Figure 3:
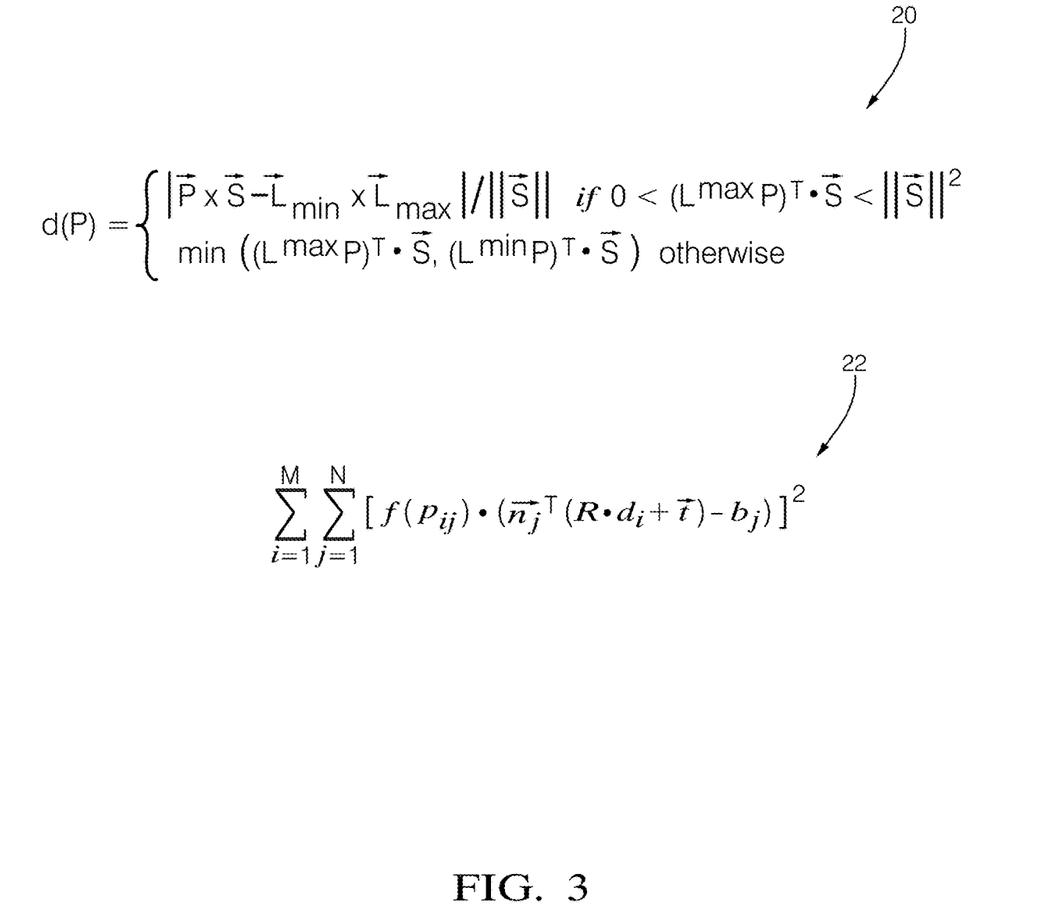
FIG. 3 mathematical expressions for determining the distances from FIG. 2 and for determining a rigid transformation function.

The matching 14 comprises determining a rigid transformation function by minimizing the expression 22 of FIG. 3. Expression 22 is a double sum over N lines of the map and M detection points $d_i$. This corresponds to a least squares estimator for rotation R and translation t, wherein the j-th line is parameterized by the normal vector $n_j$ and the orthogonal distance $b_j$ between the j-th line and the origin. The expression $f(p_{ij})$ denotes an exponential weighting factor for the matching and depends on the probability $p_{ij}$ of detection point $d_i$ being assigned to the j-th line. This is done by performing a Monte-Carlo simulation incorporating current pose uncertainties (position and heading or the preliminary position of the vehicle) and the detection point uncertainties, e.g. standard deviation in angle and range for a radar detection point. The propagated error ellipse (mean and standard deviation) as distribution (Gaussian) for K randomly generated samples (inputs) for each detection point is considered. First, the samples are assigned to one or more lines by using the spatial assignment. For each line, the number of assignments from the samples is counted. The probability is then calculated as the ratio between the number of assignments to the j-th line and the total amount of samples (inputs) K for the i-th detection point. The weighting factor can be used instead of a hard 0-1 assignment from the spatial assignment. This leads to an improved accuracy of the matching and hence to an improved accuracy of the determined position. The generation of K samples is illustrated in FIG. 7 showing the map portion 32', which corresponds to the map portion 32 from FIG. 6 discussed further below. A point cloud 38 is shown in the figure and represents K random samples drawn from the distribution. The distribution is represented by a propagated Gaussian error ellipse 40. An enlarged portion 36 is also shown in FIG. 7. It is understood that by using the spatial assignment the samples 38 will be assigned to different lines because the samples 38 are located in different spatial segments. In this way, the probabilities $p_{ij}$ can be determined as described.

Figure 6:
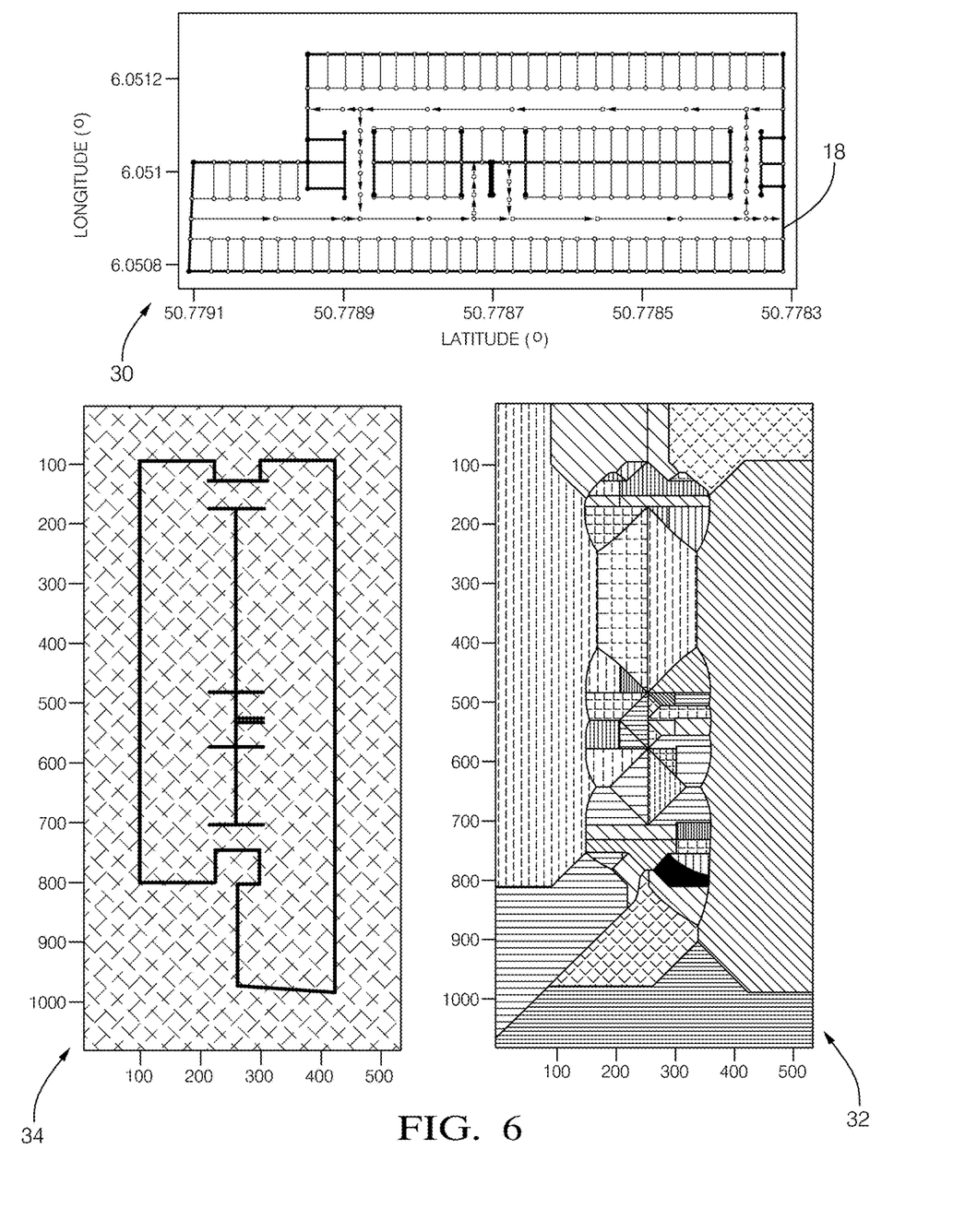
FIG. 6 a portion of the map from FIG. 4 comprising the lines of the map; a portion of the map with spatial segments assigned to the lines, and a portion of the map representing distance values between the map environment and the lines.
Figure 7:
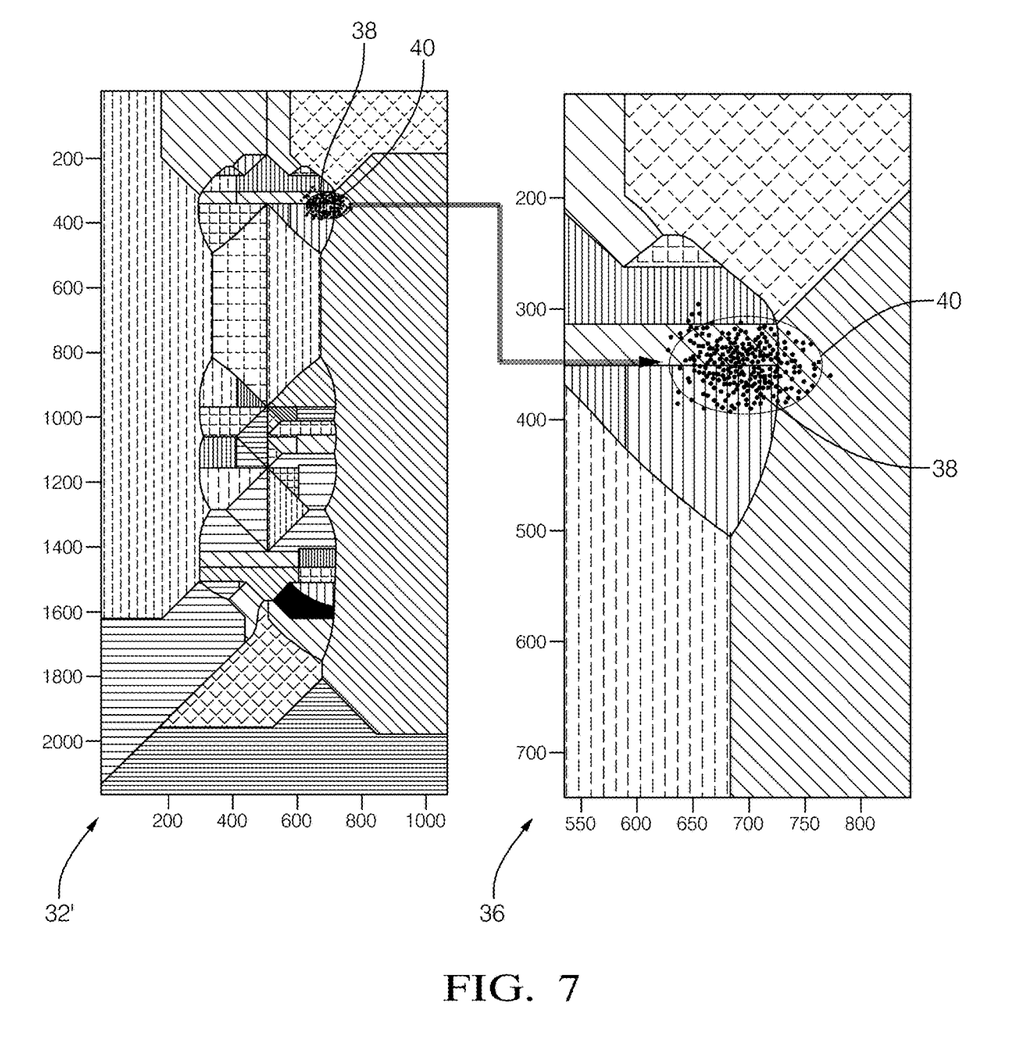
FIG. 7 portions of the map with spatial segments assigned to lines and with a plurality of samples for a given detection point.

FIG. 6 shows a portion 30 of the map 24 with lines of the map 24, for example line 18. The lines represent the walls of a parking garage level. The portion 30 can also be regarded as the map 24, wherein the spatial assignment is an additional layer or portion of this map. Another portion 32 of the map 24 is shown in FIG. 6, which corresponds to the map 24 of FIG. 4 with colored spatial segments but without the lines. FIG. 6 includes another portion 34 of the map 24 representing distance values between the map environment 26 and the lines as color intensity, i.e. for a given point in the map portion 34 the color intensity indicates the distance to the nearest line according to formula 20. The distance values form another additional layer of the map 24.

What is claimed is:

1. A system comprising:
   at least one processor configured to:
   capture, based on electromagnetic radiation received by a sensor, at least one scan comprising a plurality of detection points, each detection point representing a location in a vehicle environment;
   determine, from a database, a predefined map of the vehicle environment comprising:
   a plurality of elements in a map environment, each of the elements representing a respective static landmark of a plurality of static landmarks in the vehicle environment; and
   a spatial assignment of multiple parts of the map environment to the plurality of elements, the multiple parts being spatial positions arranged as a mesh grid comprising positions for any potential detection point;
   match, using the spatial assignment, the plurality of detection points to the plurality of elements; and
   determine a position of the vehicle based on the matching, the determined position being used to operate a vehicle in the vehicle environment.

2. The system of claim 1, wherein the at least one processor is configured to match the plurality of detection points and the plurality of elements by at least:
   identifying, for a respective detection point of the plurality of detection points, a respective part of the multiple parts of the map environment that includes the location represented by the respective detection point;
   identifying a respective element of the plurality of elements being assigned to the identified respective part; and
   assigning the identified respective element to the respective detection point.

3. The system of claim 2, wherein the predefined map comprises a plurality of spatial segments, each of the spatial segments representing a respective part of the multiple parts of the map environment and being assigned to a respective element of the plurality of elements.

4. The system of claim 3, wherein the plurality of spatial segments is defined by groups of positions of the predefined map, each position of a respective group having the same assignment to one or more of the elements of the predefined map.

5. The system of claim 3, wherein the plurality of spatial segments are configured as Veronoi segments.

6. The system of claim 2, wherein the predefined map further comprises a plurality of distance values representing distances between the multiple parts of the map environment being assigned to the plurality of elements, respectively, wherein the distance values are used for the matching.

7. The system of claim 2, wherein the predefined map further comprises:
   an identification, by the spatial assignment and for a respective part of the multiple parts of the map environment, of a respective element of the plurality of elements having a minimum distance to the respective part.

8. The system of claim 2, wherein the at least one processor is further configured to match the plurality of detection points and the plurality of elements by at least:
   determining a rigid transformation function by minimizing distances between transformed detection points and respective elements of the plurality of elements being assigned to the plurality of detection points by means of the spatial assignment, wherein the transformed detection points are respective detection points of the plurality of detection points transformed by means of the rigid transformation function.

9. The system of claim 1, wherein the at least one processor is further configured to:
   determine, based on the spatial assignment, at least one confidence value for a respective detection point of the plurality of detection points, wherein the at least one confidence value represents a probability that the respective detection point of the plurality of detection points is assigned to a respective element of the plurality of elements; and match, based on the at least one confidence value, the plurality of detection points to the plurality of elements.

10. The system of claim 9, wherein the at least one processor is configured to determine the at least one confidence value based on a Monte Carlo simulation for the respective detection point of the plurality of detection points.

11. The system of claim 10, wherein the at least one processor is further configured to:
transform the at least one confidence value to an exponential weighting factor; and
weight, by the exponential weighting factor, each respective detection point of the plurality of detection points.

12. The system of claim 1, wherein the system further comprises a light detection and ranging (LiDAR) sensor, the electromagnetic radiation comprising LiDAR signals.

13. The system of claim 1, wherein the system further comprises a radar sensor, the electromagnetic radiation comprising radar signals.

14. The system of claim 12, wherein the system further comprises a LiDAR sensor, the electromagnetic radiation comprising a combination of radar signals and LiDAR signals.

15. A non-transitory computer-readable media comprising instructions that, when executed, configure at least one processor to:
capture, based on electromagnetic radiation received by a sensor, at least one scan comprising a plurality of detection points, each detection point representing a location in a vehicle environment;
determine, from a database, a predefined map of the vehicle environment comprising:
a plurality of elements in a map environment, each of the elements representing a respective static landmark of a plurality of static landmarks in the vehicle environment; and
a spatial assignment of multiple parts of the map environment to the plurality of elements, the multiple parts being spatial positions arranged as a mesh grid comprising positions for any potential detection point;
match, using the spatial assignment, the plurality of detection points to the plurality of elements; and
determine a position of the vehicle based on the matching, the determined position to be used for operating a vehicle safely in the vehicle environment.

16. The non-transitory computer-readable media of claim 15, wherein the instructions, when executed, configure the at least one processor to match the plurality of detection points and the plurality of elements by at least:
identifying, for a respective detection point of the plurality of detection points, a respective part of the multiple parts of the map environment that includes the location represented by the respective detection point;
identifying a respective element of the plurality of elements being assigned to the identified respective part; and
assigning the identified respective element to the respective detection point.

17. The non-transitory computer-readable media of claim 16, wherein:
the predefined map comprises a plurality of spatial segments, each of the spatial segments representing a respective part of the multiple parts of the map environment and being assigned to a respective element of the plurality of elements.

18. The non-transitory computer-readable media of claim 17, wherein the plurality of spatial segments is defined by groups of positions of the predefined map, each position of a respective group having the same assignment to one or more of the elements of the predefined map.

19. The non-transitory computer-readable media of claim 17, wherein the plurality of spatial segments are configured as Veronoi segments.

20. A method comprising:
capture, based on electromagnetic radiation received by a sensor, at least one scan comprising a plurality of detection points, each detection point representing a location in a vehicle environment;
determining, from a database, a predefined map of the vehicle environment comprising:
a plurality of elements in a map environment, each of the elements representing a respective static landmark of a plurality of static landmarks in the vehicle environment; and
a spatial assignment of multiple parts of the map environment to the plurality of elements, the multiple parts being spatial positions arranged as a mesh grid comprising positions for any potential detection point;
matching, using the spatial assignment, the plurality of detection points to the plurality of elements; and
determining a position of the vehicle based on the matching, the determined position to be used for operating a vehicle safely in the vehicle environment.

* * * * *